United States Patent [19]

Minton

[11] Patent Number: 6,014,643
[45] Date of Patent: Jan. 11, 2000

[54] INTERACTIVE SECURITIES TRADING SYSTEM

[76] Inventor: Vernon F. Minton, Canterberry Cir., Fort Worth, Tex. 76112

[21] Appl. No.: 08/703,133

[22] Filed: Aug. 26, 1996

Related U.S. Application Data

[60] Provisional application No. 60/020,865, Jun. 28, 1996.

[51] Int. Cl.⁷ .................................................. G06F 17/60
[52] U.S. Cl. ............................. 705/37; 705/26; 705/36; 705/38; 705/40
[58] Field of Search ................................ 705/37, 39, 26, 705/40, 36

[56] References Cited

U.S. PATENT DOCUMENTS

| | | | |
|---|---|---|---|
| 3,573,747 | 4/1971 | Adams | 705/37 |
| 4,346,442 | 8/1982 | Musmanno | 364/408 |
| 4,376,978 | 3/1983 | Musmanno | 364/408 |
| 4,412,287 | 10/1983 | Braddock, III | 364/408 |
| 4,674,044 | 6/1987 | Kalmus et al. | 364/408 |
| 4,677,552 | 6/1987 | Sibley, Jr. | 705/37 |
| 4,700,297 | 10/1987 | Hagel, Sr. et al. | 364/408 |
| 4,774,663 | 9/1988 | Musamanno et al. | 364/408 |
| 4,903,201 | 2/1990 | Wagner | 705/37 |
| 5,063,507 | 11/1991 | Lindsey et al. | 705/26 |
| 5,136,501 | 8/1992 | Silverman et al. | 705/37 |
| 5,270,922 | 12/1993 | Higgins | 364/408 |
| 5,285,383 | 2/1994 | Lindsey et al. | 705/26 |
| 5,297,032 | 3/1994 | Trojan et al. | 364/408 |
| 5,375,055 | 12/1994 | Togher et al. | 705/37 |
| 5,563,783 | 10/1996 | Stolfo et al. | 705/37 |
| 5,689,652 | 11/1997 | Lupien et al. | 705/37 |
| 5,717,989 | 2/1998 | Tozzoli et al. | 705/37 |

OTHER PUBLICATIONS

Securities and Exchange Commission (SEC) Proposed Rules/Federal Register/vol. 60, No. 195/Release No. 34–36310, Oct. 10, 1995.

*Primary Examiner*—Allen R. MacDonald
*Assistant Examiner*—Romain Jeanty
*Attorney, Agent, or Firm*—James E. Bradley

[57] ABSTRACT

A first individual enters an offer to sell a security on a first data processing system. This offer is sent to a server over a communication network which is available to the public. From the server, the offer is transmitted to additional data processing systems which are connected to the publicly-available communication network. The first user's offer is eventually sent to a second data processing system, where a second individual enters an acceptance to the first user's offer to sell a security. This second user's acceptance is then transmitted back to the server over the publicly-available communication network. Upon the arrival of the acceptance, an account belonging to the second user is debited for the amount of the security just purchased, and the second user obtains title to the securities.

4 Claims, 7 Drawing Sheets

Sell: ○ to Close  ○ Short to Open  ○ Short Against the Box  ● Markets

Offer to Sell
- Quantity: 5,000
- Limit Price: $38.01
- Minimum: 1,000

BANK OF UTOPIA
JOHN DOE 879387472834745

Advertising Apace Available (800) 555-5555

Long Position Lot Selection
Select Position

Expiration of Order
● Good til Canceled  ○ 24 Hours  ○ Other Date:  05-13-1996

Special Orders
☐ Do not Reduce  ☐ Negotiate  ☒ RMST Only  ☐ All or None

| Help | RMST Market | Virtual Market | Cancel |

Last Trade = 8400
Position = SHORT 500
Basis / Share = $37.89400
Profit (Loss) = $143.00

Vol  Bid  Mkt  Ask  Vol

TRADE REPORT
Other Markets
Monitor Markets

☒ Auto Pilot
Bid Open
Ask Open

Fig. 12

INTERACTIVE SECURITIES TRADING SYSTEM

This application claims benefit of Provisional Application 60/020,865, filed Jun. 28, 1996.

BACKGROUND OF INVENTION

1. Technical Field

The present invention relates generally to data processing systems and networks of data processing systems, and more specifically to systems which allow individuals to trade securities directly with other individuals who are not brokers, specialist or market makers.

2. Description of the Related Art

For hundreds of years, institutions have existed which allow people to buy and sell securities (e.g., stocks, futures, options, commodities, etc.) from one another. Today, examples of these institutions are: The New York Stock Exchange (NYSE), The National Association of Security Dealers Automated Quotation (NASDAQ) System, and The American Stock Exchange (AMEX). These modern security exchanges facilitate the exchange of several hundred million shares of stock every business day.

While a significant portion of this trading is initiated by individuals, either directly or indirectly, these individuals cannot trade securities directly on the above mentioned exchanges. If a user wishes to buy or sell stock or other securities, they must go through a brokerage firm or a stock broker. These brokers are the ones who actually execute a customer's order to buy or sell a security.

There are two primary ways brokers generate income from executing customer orders. First, brokers often charge a commission for executing a customer's order. Depending on the broker, this commission may vary with the number of shares traded. For example, a broker may charge a base rate of $50.00 to execute a trade, plus an-additional 5 cents per share for every share traded. There is nothing secretive about the commission a broker charges, and customers are familiar with the commissions charged by their brokers.

A second way brokers derive income from customers is by taking advantage of the difference between the selling (ask) price and the buying (bid) price of a security. Unlike most consumer items, securities are often listed at two prices: a first price if one is buying the security, and a second price if one is selling the security. The selling price is known as the ask price and the buying price is known as the bid price. For example, if a user asks Broker A for the price of a share of stock from ABC Company, the broker may tell the customer that a share of ABC stock can be bought for $50.50, and a share of ABC stock may be sold for $50.10. The bid and ask price are not numbers set by a single entity or government agency, rather, these numbers are generated by a broker and constantly fluctuate as the price of a security moves up or down. The difference between the bid price and the ask price is known as the spread.

A broker can make money on the spread by connecting customers who want to sell a security at a relatively low price with other customers who wish to buy a security at relatively high price. Due to the advanced nature of today's communications systems, a broker is in constant contact with many other brokers and institutions which buy and sell securities. These other brokers and institutions are constantly communicating to a given broker various offers to buy and sell securities, at a range of prices.

As stated above, a broker can make money from executing a customer's order by connecting two customers who are willing to pay different amounts for the same security. For instance, Customer A goes to Broker B and informs Broker B that he wishes to buy one hundred shares of ABC stock for $50.00. Broker B can then log into his communications network to see what other brokers and institutions are charging for one hundred shares of ABC. Broker B may find another broker willing to sell one hundred shares of ABC for $49.50. In this instance, Broker B will, on behalf of Customer A, buy one hundred shares of ABC for the price of $49.50. However, Customer A will be charged $50.00 per share for the stock that Broker B bought for $49.50 per share. Thus, Broker B will be able to keep 50 cents per share, or $50.00 for the one hundred shares of ABC purchased. This type of profit making is allowed to happen, despite the many regulations that brokers operate under. This same situation repeats itself when a broker finds another user willing to pay a higher price than what a given seller is asking.

The above situation repeats itself many times a day, and creates substantial revenues for commodity and stock brokers. Further, a customer has no way to protect himself from this type of exploitation, since customers do not have access to the communications networks of the broker. Also, customers often do not realize a broker is making money from them in this fashion.

Another advantage brokers enjoy over consumers is that they can make markets in a given security. Making a market in a given security refers to the situation where a broker is simultaneously buying and selling the same security at slightly different prices. Brokers can make markets by being connected to many other brokers and institutions. A broker generates income by making markets because he can sell a security for a slightly higher price that he buy the same security. If a broker can repeatedly sell a given security for 50 cents more than he buys it, this broker can continue the process and generate income by taking advantage of the fact that he can sell a security for more than he can buy it.

Individuals are unable to make markets in securities because they do not have access to the large communications networks that brokers have access. To effectively make a market, one must be able to communicate with many potential buyers and sellers of the security in which one wishes to make a market. This ability is easily accomplished by brokers, but, as stated above, individuals do not have access to the resources needed to make markets.

Therefore, what is needed is a data processing system and a network of data processing systems whereby individuals can buy and sell directly from each other, with only minimal involvement by a broker. In such a communications network an individual would be in a similar position to that of a broker, i.e, an individual would have access to many other individuals wishing to buy and sell securities. In such a network, an individual would be able to select among many competing offers to buy and sell, and thus would be able to get a better deal than if they were going though a broker. Also, such a network would allow individuals to make markets in the securities they wish.

SUMMARY OF THE INVENTION

It is therefore an object of the present invention to provide a data processing system, and a network of data processing systems for allowing individuals to buy and sell securities directly from other individuals, with only minimal oversight by a broker.

It is yet another objective of the present invention to provide individuals with the ability to make markets in the security of their choosing.

These objectives and others are achieved by providing a plurality of data processing systems connected by a communications network. Initially, a first individual enters an offer to sell a security on a first data processing system. This offer is sent to a server over the communication network which is available to the public. From the server, the offer is transmitted to additional data processing systems which are connected to the communication network. The first user's offer is eventually sent to a second data processing system, where a second individual enters an acceptance to the first user's offer to sell a security. This second user's acceptance is then transmitted back to the server over the communication network. Upon the arrival of the acceptance, an account belonging to the second user is debited for the amount of the security just purchased, and the second user obtains title to the securities.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
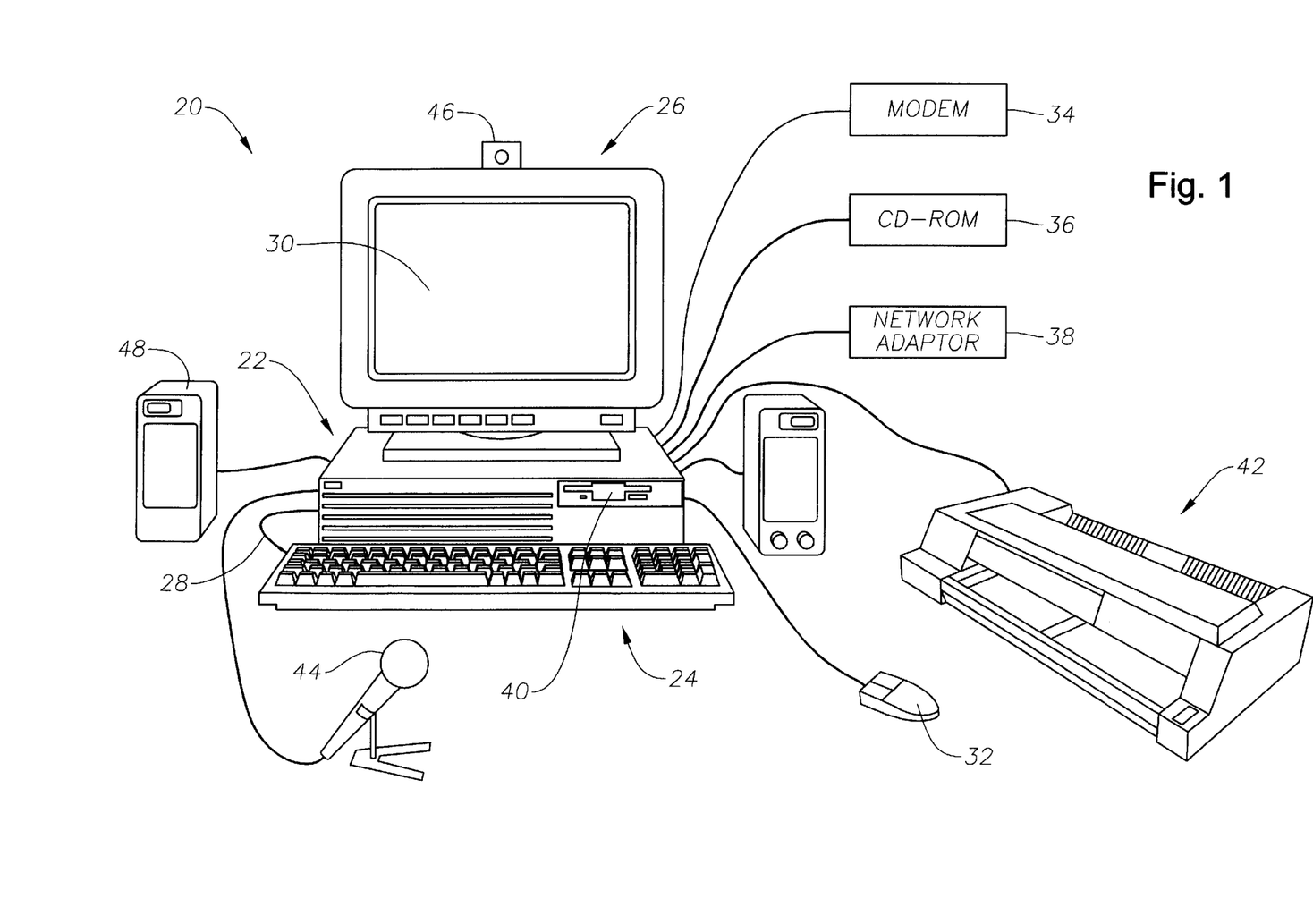
FIG. 1 depicts a data processing system in accordance with the method and system of the present invention.

FIG. 1 depicts data processing system 20. Data processing system 20 is capable of executing the computer program which allows users to buy and sell securities from other users over an individual security trading network. (The individual security trading network will be discussed in a subsequent portion of this specification.) Data processing system 20 can be the data processing system from which a user can buy and sell securities from other users attached to the individual security trading network; or it can function as a server for the individual security trading network. Generally, when functioning as a server, data processing system 20 will have more processing power, storage capability, memory, etc. than when it is functioning as a user's data processing system.

Data processing system 20 includes processor 22, keyboard 24, and display 26. Keyboard 24 is coupled to processor 22 by a cable 28. Display 26 includes display screen 30, which may be implemented utilizing a cathode ray tube (CRT), a liquid crystal display (LCD), an electroluminescent panel, or the like. Data processing system 20 also includes pointing device 32, which may be implemented utilizing a track ball, joystick touch sensitive tablet or screen, trackpad, or as illustrated in FIG. 1, a mouse. Pointing device 32 may be utilized to move a pointer or cursor on display screen 30. Processor 22 may also be coupled to one or more peripheral devices, such as modem 34, CD-ROM 36, network adaptor 38 and floppy disk drive 40, each of which may be internal or external to the enclosure of processor 22. An output device such as printer 42 may also be coupled to processor 22. Speakers 48, camera 46, and microphone 44 are provided for multimedia applications.

Those users skilled in the art of data processing system design should recognize that display 26, keyboard 24, and pointing device 32 may each be implemented utilizing any one of several known off-the-shelf components. Data processing system 20 may be implemented utilizing any general purpose computer or so-called personal computer.

Figure 2:
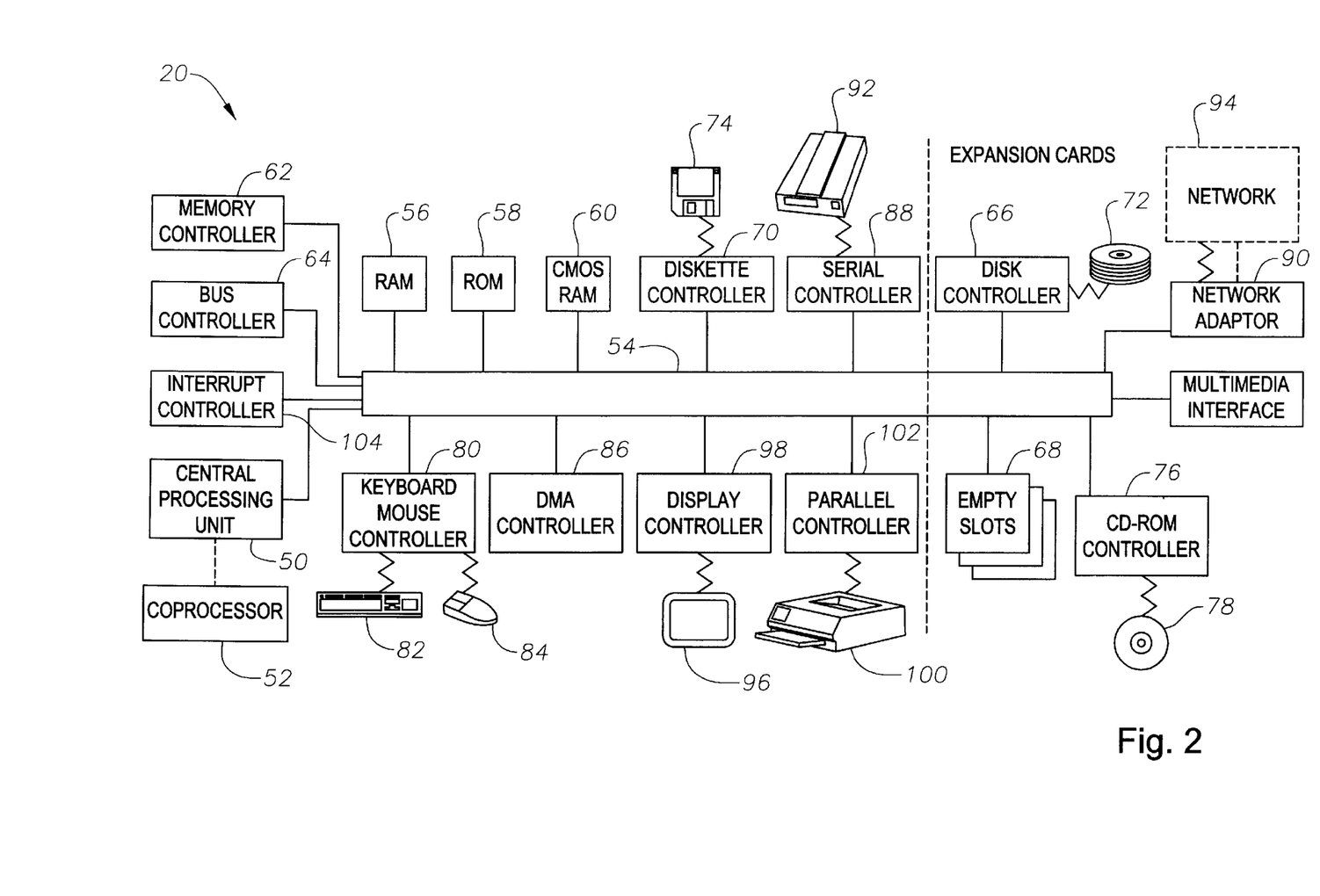
FIG. 2 is a more detailed high-level block diagram which further illustrates the major components of the data processing system of FIG. 1.

With reference now to FIG. 2, there is depicted a high-level block diagram which further illustrates the major components that may be included in data processing system 20 of FIG. 1. Data processing system 20 is controlled primarily by computer readable instructions, which may be in the form of software, wherever, or by whatever means such software is stored or accessed. Such software may be executed within central processing unit (CPU) 50 to cause data processing system 20 to do work. In many known workstations and personal computers central processing unit 50 is implemented by a single-chip CPU called a microprocessor. Examples of such microprocessors include the microprocessor sold under the trademark "PENTIUM" by Intel Corporation and the microprocessor sold under the trademark "PowerPC" by International Business Machines Corporation.

Coprocessor 52 is an optional processor, distinct from main CPU 50, that performs additional functions or assists CPU 50. One common type of coprocessor is the floating-point coprocessor, also called a numeric or math coprocessor, which is designed to perform numeric calculations faster and better than general-purpose CPU 50. Recently, however, the functions of many coprocessors have been incorporated into more powerful single-chip microprocessors.

CPU 50 fetches, decodes, and executes instructions, and transfers information to and from other resources via the computer's main data-transfer path, system bus 54. Such a system bus connects the components in data processing system 20 and defines the medium for data exchange. System bus 54 typically includes data lines for sending data, address lines for sending addresses, and control lines for sending interrupts and for operating the system bus. An example of such a system bus is the PCI (Peripheral Component Interconnect) bus. Some of today's advanced busses provide a function called bus arbitration that regulates access to the bus by extension cards, controllers, and CPU 50. Devices that attach to these busses and arbitrate to take over the bus are called bus masters. Bus master support also allows multiprocessor configurations of the busses to be created by the addition of bus master adapters containing a processor and its support chips.

Memory devices coupled to system bus 54 include random access memory (RAM) 56, read only memory (ROM) 58, and nonvolatile memory 60. Such memories include circuitry that allows information to be stored and retrieved. ROMs contain stored data that cannot be modified. Data stored in RAM can be read or changed by CPU 50 or other hardware devices. Nonvolatile memory is memory that does not lose data when power is removed from it. Nonvolatile memories include ROM, EPROM, flash memory, bubble memory, or battery-backed CMOS RAM. As shown in FIG. 2, such battery-backed CMOS RAM may be utilized to store system configuration information.

Access to RAM 56, ROM 58, and nonvolatile memory 60 may be controlled by memory controller 62 and bus controller 64. Memory controller 62 may provide an address translation function that translates virtual addresses into physical addresses as instructions are executed. Memory controller 62 may also provide a memory protection function that isolates processes within the system and isolates system processes from user processes. Thus, a program running in user mode can access only memory mapped by its own process virtual address space; it cannot access memory within another process's virtual address space unless memory sharing between the processes has been set up.

An expansion card or expansion board is a circuit board that includes chips and other electronic components connected in a circuit that adds functions or resources to the computer. Typical expansion cards add memory, disk-drive controllers 66, video support, parallel and serial ports, and internal modems. For laptop, palmtop, and other portable computers, expansion cards usually take the form of PC Cards, which are credit card-size devices designed to plug into a slot in the side or back of a computer. An example of such a slot is the PCMCIA slot (Personal Computer Memory Card International Association) which defines type I, II and III card slots. Thus, empty slots 68 may be used to receive various types of expansion cards or PCMCIA cards.

Disk controller 66 and diskette controller 70 both include special-purpose integrated circuits and associated circuitry that direct and control reading from and writing to a hard disk drive 72 and a floppy disk or diskette 74, respectively. Such disk controllers handle tasks such as positioning read/write head, mediating between the drive and the microprocessor, and controlling the transfer of information to and from memory. A single disk controller may be able to control more that one disk drive.

CD-ROM controller 76 may be included in data processing system 20 for reading data from CD-ROMs 78 (compact disk read-only memory). Such CD-ROMs use laser optics rather than magnetic means for reading data. Multi-media interface 108 interfaces with multi-media end devices such as speakers 48, camera 46, and microphone 44. These multi-media end devices provide the ability engage in video conferencing and other applications which require video and sound input and output.

Keyboard mouse controller 80 is provided in data processing system 20 for interfacing with keyboard 82 and a pointing device, such as mouse 84. Such pointing devices are typically utilized to control an on-screen element, such as a cursor, which may take the form of an arrow having a hot spot that specifies the location of the pointer when the user presses a mouse button. Other pointing devices include the graphics tablet, the stylus, the light pen, the joystick, the puck, the trackball, and the trackpad.

Direct memory access (DMA) controller 86 may be used to provide a memory access that does not involve CPU 50. Such memory accesses are typically employed for data transfer directly between memory and an "intelligent" peripheral device, such as between memory 56 and disk controller 66.

Communication between data processing system 20 and other data processing systems may be facilitated by serial controller 88 and network adaptor 90, both of which are coupled to system bus 54. Serial controller 88 is utilized to transmit information between computers, or between a computer and peripheral devices, one bit at a time over a single line. Serial communications can be synchronous (controlled by some time standard such as a clock) or asynchronous (managed by the exchange of control signals that govern the flow of information). Examples of serial communications standards include the RS-232 interface and the RS-422 interface.

As illustrated, such a serial interface may be utilized to communicate with modem 92. A modem is a communications device that enables a computer to transmit information over a standard telephone line. Modems convert digital computer signals to analog signals suitable for communication over telephone lines. Modem 92 may provide a connection to other sources of software, such as a server, an electronic bulletin board, and the Internet or World Wide Web.

Network adaptor 90 may be used to connect data processing system 20 to a local area network 94. Network 94 may provide computer users with means of communicating and transferring software and information electronically. Additionally, network 94 may provide distributed processing, which involves several computers and the sharing of workloads or cooperative efforts in performing a task.

Display 96, which is controlled by display controller 98, is used to display visual output generated by data processing system 20. Such visual output may include text, graphics, animated graphics, and video. Display 96 may be implemented with a CRT-based video display, an LCD-based flat-panel display, or a gas plasma-based flat-panel display. Display controller 98 includes electronic components required to generate a video signal that is sent to display 96.

Printer 100 may be coupled to data processing system 20 via parallel controller 102. Printer 100 is used to put text or a computer-generated image on paper or on another medium, such as a transparency. Other types of printers may include an imagesetter, a plotter, or a film recorder.

Parallel controller 102 is used to send multiple data and control bits simultaneously over wires connected between system bus 54 and another parallel communication device, such as printer 100. The most common parallel interface is the Centronics interface.

During data processing operations, the various devices connected to system bus 54 may generate interrupts which are processed by interrupt controller 104. An interrupt is a request for attention from CPU 50 that can be passed to CPU 50 by either hardware or software. An interrupt causes the microprocessor to suspend currently executing instructions, save the status of the work in progress, and transfer control to a special routine, known as an interrupt handler, that causes a particular set of instructions to be carried out. Interrupt controller 104 may be required to handle a hierarchy of interrupt priorities and arbitrate simultaneous interrupt requests. Interrupt controller 104 may also be used to temporally disable interrupts.

Figure 3:
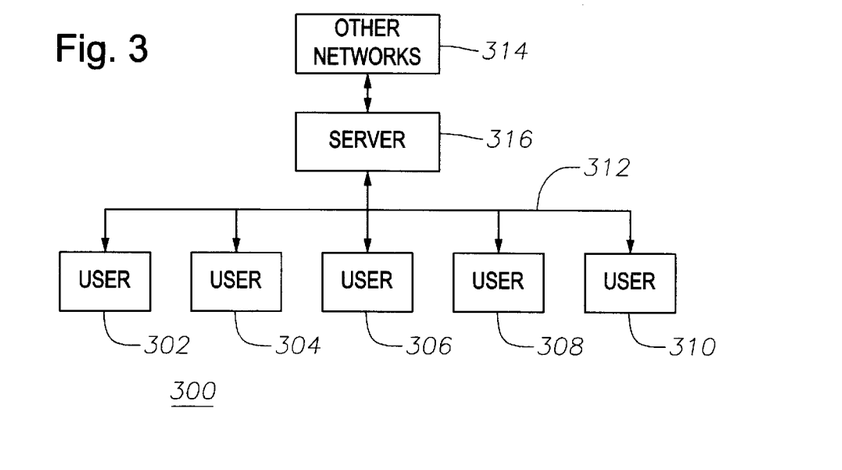
FIG. 3 illustrates a block diagram of the individual securities trading network according to the present invention.

FIG. 3 illustrates the individual security trading network according to the present invention. Individual security trading network 300 is comprised a plurality of users connected to a central server. Users 302–310 are connected to server 316 by communications links 312. Users 302–310 can be individuals operating data processing systems, such as the data processing system depicted in FIGS. 1 and 2.

In the preferred embodiment, communications links 312 represent the modem-to-modem communications links between the users and server 316. Although users 302–310 may communicate with server 316 using a modem to send information over public telephone lines, many other types of communications links are possible between users 302–310 and server 316. Some other examples of possible communication methods between users 302–310 and server 316 are cable modems, local area networks, wireless communications, fiber optics lines, and others. The method by which users 302–310 communicate with server 316 is not important, as the present invention simply requires that the users be able to send and receive information to server 316. Also, although only five users are shown in FIG. 3, the present invention can accommodate many additional users at any given time.

Server 316 is provided to allow users 302–310 to view each other's buy and sell orders, as well as to allow for the management of these orders and of the individual securities trading network as a whole. When a user forms an order to buy or sell a security, this order is transferred from the user to server 316. An order formed by a user is an offer to buy or sell a security where the user has defined the parameters (e.g., the price, quantity) of the offer. When the user's order is received at server 316, the order is reviewed by a broker, then, the order is combined with other orders for transmission to the other users. In this manner, when one user makes an offer to buy or sell a security, the other users connected to the individual securities trading network receive this information and are able to accept the original user's offer.

Although FIG. 3 depicts server 316 as a single unit, in reality, server 316 is comprised of several computing units and these units may be distributed over a large area. Server 316 would typically contain external storage units, communication interfaces for transferring data to users, processor and memory subsystems, and other computing devices that are commonly attached to server devices.

Besides allowing users to buy and sell securities from each other, server 316 performs many other functions. For instance, server 316 can provide e-mail and video conferencing services to the users. Also, server 316 can server as a interface to other computing resources such as the Internet, financial news services, and other networks which buy and sell securities.

These other networks which buy and sell securities can be separate networks contain other users or entities buying and selling securities. These other networks may be administered by entities other than the one which administers the individual securities trading network, but, through prior agreements, offers to buy and sell securities on a separate network can be publicized on the individual securities trading network, and vice versa. Displaying orders to buy and sell securities which have originated from other networks increases the total number of orders available to users connected to the individual securities trading network. This increases the liquidity of the securities being bought and sold, and enhances the individual securities trading network in general.

In summary, individual securities trading network 300 allows users 302–310 to transmit to server 316 offers to buy and sell various securities. Server 316 receives these offers and transmits them to other users who are interested in the same security. When one user accepts another user's offer to buy or sell a security, server 316 "crosses" these orders. Server 316 crosses an order by matching an order to buy a security with an order to sell the same security at the same price. In the case of the present invention, crossing two orders involves matching an order from one individual directly with the order of another individual, and executing these orders, after broker approval. As stated above, when a user places an order to buy or sell a security, server 316 allows a broker to pre-approve the user's offer to buy or sell a security.

Users 302–310 communicate with server 316 using a data processing system such as those shown in FIGS. 1 and 2. These data processing systems are controlled by a user trading program which allows a user to enter offers to buy and sell securities, as well as to view and accept offers to buy and sell securities which have originated from other users.

Figure 4:
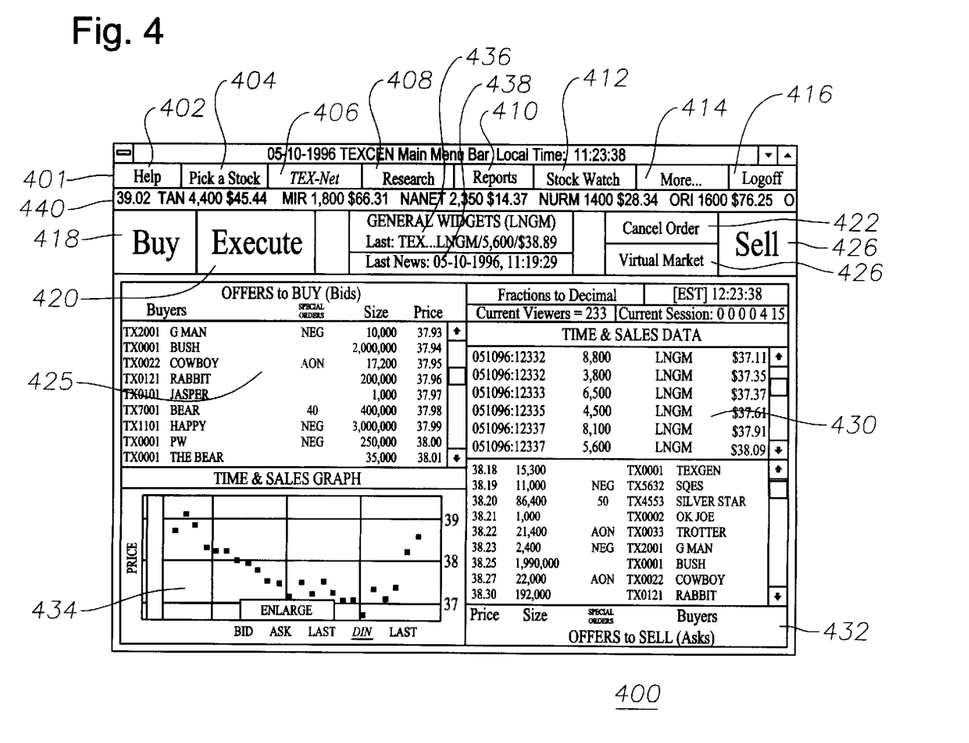
FIG. 4 illustrates the trading screen of the program controlling a user's data processing system according to the present invention.

FIG. 4 illustrates the trading screen of the program controlling a user's data processing system according to the present invention. In a preferred embodiment of the present invention, the user trading program which controls a user's data processing system executes under a graphical user interface such as Microsoft Windows or Microsoft Windows '95. However, executing under a graphical user interface does not affect the functionality of the trading program, and hence, the user trading program may execute on data processing systems which do not have graphical user interfaces.

Some of the various functions available in the user trading program can be accessed from menu bar 401 located a the top of trading screen 400. Activation of PickaStock button 404 will display pricing screen 500, shown in FIG. 5. This screen enables a user to select the individual security or stock about which they wish to receive information. This information will be subsequently displayed in buy window 428, sales data window 430, sell window 432, sales graph window 434, and other locations.

Activation of TexNet button 406 allows a user to access various communication features provided by the individual securities trading network shown in FIG. 3. For example, security quotes, e-mail, video conferencing, video mail, and other services are made available by activating Tex Net button 406.

Activation of research button 408 allows a user to display fundamental and technical information on a company. This information includes 10-Ks, the names of directors, ratios, sales figures, recent news announcements, and other information.

Activation of reports button 410 will display reports of a user's cash flow, account activity, positions in various securities, and other information.

Activation of stock watch button 412 allows a user to activate ticker tape 440. From the screen displayed by the activation of stock watch button 412, a user can personalize ticker tape 440 so that only the stocks of interest to the user will be displayed. Activation of help button 402 displays a variety of context sensitive help screens that explain the functionality of the trading program. Activation of "More . . ." button 414 allows a user to perform housekeeping operations with respect to their trading account. For instance, activation of "More . . ." button 414 allows a user to change their password, change their screen name, and configure the communications settings for their given data processing system. Also, a user may transfer money into or out of their trading account after activating "More . . ." button 414. Activation of logoff button 416 will log a user off the individual securities trading network.

Cancel order button 422 allows one to cancel a previously entered limit order. Virtual market button 426 initiates a process by which a user can make markets in a security, which will be discussed in a subsequent portion of this specification. Last news button 438 displays recent news stories regarding the security listed in field 436.

A user can place orders to buy or sell a security by activating buy button 418 or sell button 424. Activation of buy button 418 will cause buy screen 600, illustrated in FIG. 6, to be displayed. Buy screen 600 allows a user to input the details of the security they wish to purchase. After completing the information in buy screen 600, a user is returned to trading screen 400.

Figure 7:
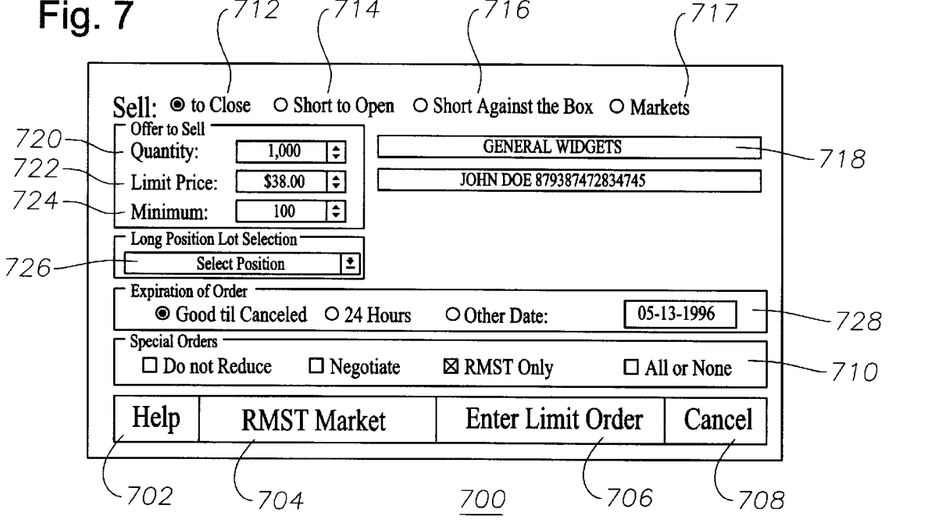
FIG. 7 depicts the screen where information relating to an order to sell a security is entered.

In a similar manner, activation of sell button 424 will display sell screen 700 depicted in FIG. 7. When sell screen 700 is displayed, a user can enter information relating to the security they wish to sell. When a user completes sell screen 700, they are returned to trading screen 400.

When a user places a sell or buy order, this order will be either a market order or a limit order. A market order is an order that is able to be executed immediately. A limit order is an order which cannot be executed immediately due to the current price of the security and the price at which the order was placed.

For example, if a user wanted to sell a share of ABC stock for $39.00, and, there were people in the market who were willing to pay $39.00 and up for the share of ABC stock, the user could sell the stock immediately. In this instance, an order to sell one share of ABC for $39.00 would be considered a market order because such an order could be executed immediately. However, if this same user was wanting to sell the share of ABC stock for $42.00 and the most a user in the market was willing to pay for this share of stock was $40.00, this order could not be executed immediately. The reason this order could not be executed immediately is there would be a $2.00 difference between the lowest price the user was willing to accept for their share of stock and the highest price another user was willing to pay for it. In such cases, these limit orders remain active until they either expire or they are canceled by a user. A limit order is executed when the price of a security falls or rises up to the limit specified by a user. In the above example, if the price of a share of ABC stock continued to rise until someone was willing to pay $42.00 for it, at that time, the limit order specified by the user could be executed.

In trading screen 400, limit orders to buy are displayed in buy window 428, and limit orders to sell are displayed in sell window 432. These orders display the user name and user identification number of the user who wishes to buy or sell the security. Also shown is the price and quantity of the security being traded, and any special conditions of the order. As is shown in FIG. 4, buy window 428 contains various limit orders to buy various amounts of General Motors' (GM) stock. Likewise, sell window 432 contains various limit orders to sell various amounts of GM stock.

Field 436 displays the name of the stock currently being traded in windows 428 and 432.

Sales graph window 434 displays short term technical trading information for the security listed in field 436. This information enables one to identify trends and/or buy or sell opportunities. Sales graph chart 434 displays offers to buy and offers to sell that originated from other users connected to the individual securities trading network, the price of trades that have been executed between users connected to the individual securities trading network, and the execution price of other trades in the same security that have occurred in markets other than the one to which the user is connected.

Sales data window 430 displays the time, the size, and the price of all orders that have been executed on the individual securities trading network.

Figure 5:
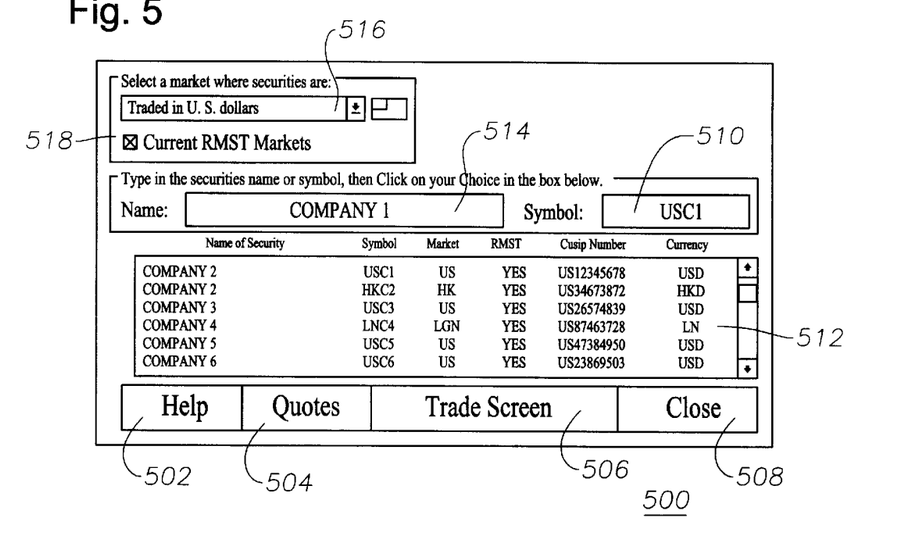
FIG. 5 depicts the screen where a user can specify the security about which they wish to receive pricing information.

FIG. 5 depicts the screen where a user can specify the security about which they wish to receive pricing information. Selection box 516 allows a user to select a market where securities are traded in a given currency. As is shown in pricing screen 500, a user has chosen to display the securities in a market where the securities are traded in U.S. dollars.

Window 512 contains a list of the securities in the market specified by the user in box 516. From window 512, a user can select a given security. The security chosen by the user will appear in box 514, and the symbol under which the security is traded will appear in box 510.

Several fields of information are displayed for each security in window 512. First, the name of the security is displayed. Next, the symbol which represents the security is shown. Next, the country where the security is traded is illustrated. If the security is traded on the individual securities trading network, that information is denoted under the column labeled RMST. A cusip number for each security is also provided. A security's cusip number is a unique numerical identifier for a given security. Finally, the primary market in which the security is traded is also displayed. When current markets field 518 is activated, only those securities available to be traded within the individual securities trading network will be displayed in window 512. If current markets field 518 is not activated, securities external to the individual securities trading network will be shown in window 512.

At the bottom of pricing screen 500, there is displayed a plurality of buttons. Activation of help button 502 will display another screen containing information on how to make use of the fields in pricing screen 500. Quotes button 504 will display a screen which contains pricing information on the security selected by the user in window 512. Activation of trade screen button 506 will return one to trading screen 400. Finally, close button 508 will close pricing screen 500 and will return the user to the previously displayed screen. Pricing screen 500 is displayed by activating PickaStock button 404, shown in FIG. 4.

Figure 6:
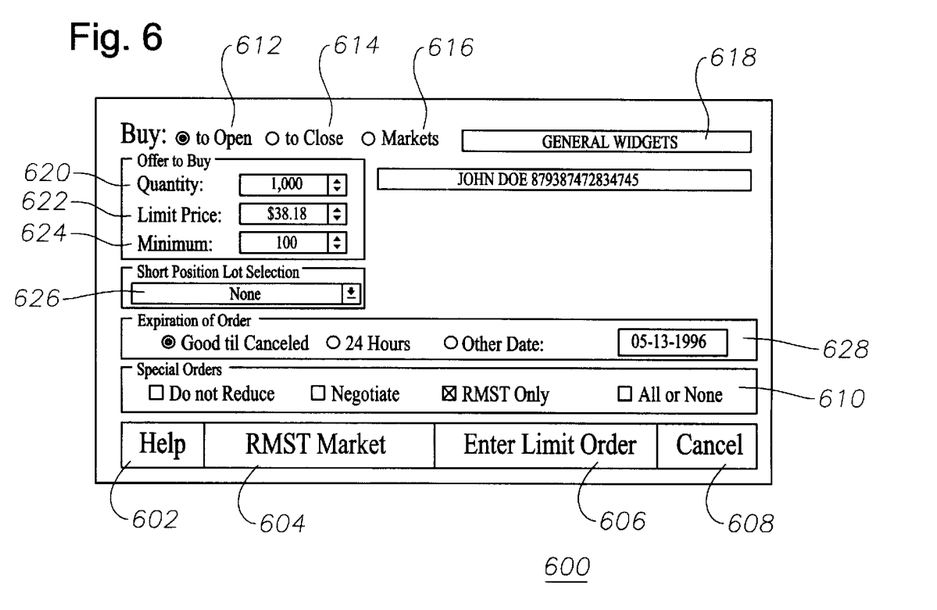
FIG. 6 illustrates the screen where information relating to an order to buy a security is entered.

FIG. 6 illustrates the screen where information relating to an order to buy a security is entered. Buy screen 600 may be displayed by activating buy button 418 in trading screen 400. From buy screen 600, a user can enter pricing and quantity information for a security they wish to purchase. At the top of buy screen 600 is buy to open button 612, buy to close button 614 and markets button 616. If a user wishes to buy a security to add to their portfolio, buy to open button 612 is activated. If a user wishes to buy to cover a short position, buy to close button 614 is activated. If a user wishes to make a market in a given security, markets button 616 is activated. The ability to make markets in a given security will be illustrated and discussed in a subsequent section of this specification.

Quantity field 620 allows one to specify the number of shares of a given security they wish to purchase. Limit price field 622 allows one to specify a maximum price for the security to be bought. If the price entered in limit price field 622 is equal to or greater than the lowest price at which another user wishes to sell a security, the buy order will be treated as a market order. If the price specified in limit price field 622 is less than the lowest price at which a user is wanting to sell a given security, the order specified will be treated as a limit order.

When markets button 616 has been previously activated, the value entered into minimum field 624 will be treated as the market size for the market a user wishes to create.

If buy to close field 614 has been activated, one must enter a value into short position lot selection field 626. Selection of a lot in field 626 allows the individual securities trading system to know which short lot to apply the securities bought with the order being specified in buy screen 600.

Expiration of order field 628 allows a user to specify when a limit order should expire. Special order field 610 allow one to place special conditions upon the order being entered into buy screen 600. Activation of the do not reduce field will cause the trading system not to automatically reduce the limit price if the security specified in field 618 pays a dividend.

Activation of the negotiate field will make a notation in trading screen 400 that the price specified for this buy order is negotiable. To negotiate an order, a user in the individual trading system can contact another user through e-mail, or video conferencing. During this process, two users attached to the individual securities trading network can negotiate the sale or purchase of a given security. This negotiation process can be done anonymously by using only a user's user identification. If RMST only field is activated, a user's order will only be displayed to other users of the individual securities trading network. If this field is not activated, the individual securities trading network will publicize the user's offer to buy to other networks where securities are bought and sold. Activation of the all or none field specifies that an order cannot be partially filled.

Help button 602 will display context sensitive help screens, while cancel button 608 will cancel the current buy order.

After one has specified the information regarding the buy order, activation of RMST market button 604 will cause the user's buy order to be entered as a market order, according to the price specified in the limit price field 622. If the user entered a limit order, activation of enter limit order button 606 will cause the user's order to be entered as a limit order and displayed on trading screen 400.

FIG. 7 depicts the screen where information relating to an order to sell a security is entered. Sell screen 700 closely corresponds to the previously described buy screen 600. Sell screen 700 is displayed by activating sell button 424 in trading screen 400. In sell screen 700, buttons 702–708 function in the same manner as button 602–608 shown for buy screen 600. Also, the options available in special order field 710, shown in sell screen 700, are the same as in special order field 610 in buy screen 600.

Quantity field 720 allows a user to specify the number of shares they wish to sell. Limit price field 722 allows a user to specify the price at which they wish to sell their security. If the price is less than or equal to the highest price at which another user is willing to buy the security, the order will be a market order. Conversely, if the selling price specified in limit price field 722 is greater than the highest price at which another user is willing to buy the security, the order will be treated as a limit order. Minimum field 724 allows a user to specify the minimum number of shares that can be sold at one time.

Activation of sell to close button 712 allows a user to sell a security they currently own. When sell to close button 712 is activated, the particular lot the user wishes to sell must be select from long position lot selection field 726.

Activation of short to open button 714 allows a user to sell short a given security. Short against the box button 716 allows one to sell short a given security that is already owned in the user's account. The security that is already owned by the user is used a collateral against the short selling of that security. Markets button 717 indicates a user has decided to make a market in a given security, and is specifying selling information for that security. This button will be activated when a user has selected virtual market button 416, shown in FIG. 4. A description and illustration of how a user can make a market in a given security will be discussed in a following portion of this specification.

Referring now to FIG. 4, after entering a market order in either buy screen 600 or sell screen 700, the user will be returned to trading screen 400. If the user entered a market buy order, the user will be prompted to select one of the offers to sell in sell window 432. Normally, this would be the offer to sell which has the lowest price. For example, in sell window 432, the lowest price offered to sell is by the user with the user identification TEXCEN. TEXCEN's offer is to sell 15,300 shares of GM at $38.18. Offers to buy and sell in windows 428 and 432 are arranged according to price. If two offers are entered at the same price, the orders will be sorted according to their size (i.e., number of shares in the order).

In a manner very similar to a market order to buy, if a user enters a market sell order, they will be prompted to select one of the orders listed in buy window 428. Normally, this will be the offer with the greatest price.

After the user selects a given offer to buy or sell, the user will then activate execute button 420. Next, the user will be given one more chance to reconfirm the order they entered into buy screen 600 or sell screen 700. After a user reconfirms the order, the order will be directed through the network for immediate validation, approval, and execution. Validation by a broker consist of verifying that funds are available when buying securities and, that the securities are in good deliverable form when selling. Also, a broker will verify that any short sales have been approved prior to execution.

Once an order has been executed, a confirmation screen will appear with the security symbol that was just bought or sold, the number of shares traded, and the price at which the shares were traded.

Figure 8:
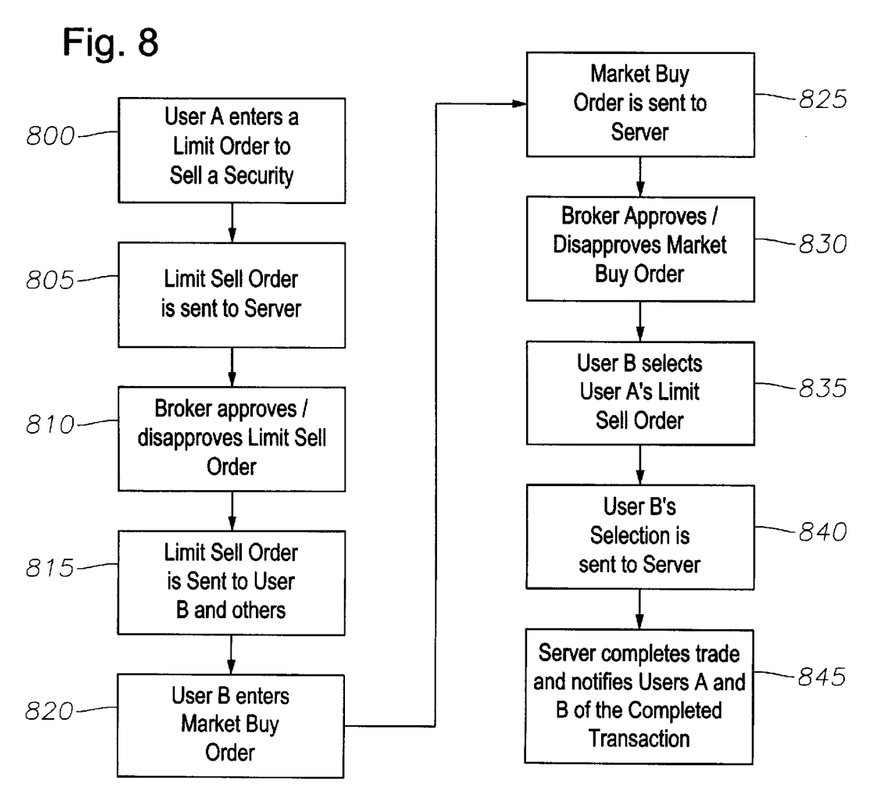
FIG. 8 illustrates the process flow by which two users connected to the trading network may buy and sell securities from each other.

FIG. 8 illustrates the process flow by which two users connected to the individual securities trading network may buy and sell securities from each other. Initially, a user connected to the individual securities trading network decides to buy or sell a security. In the example shown in FIG. 8, User A decides to enter a limit order to sell a security (800).

After a user has entered a limit order, this limit order is sent to a server over the communications network (805). Upon receipt at the server, User A's order is sent to a broker for approval or disapproval (810). This broker review consists of ensuring that there is sufficient funds in a user's account if the user is buying a security, ensuring that a user has been pre-approved if they are selling short a security, or ensuring that a user actually has the specified security in his account to sell. In the example shown in FIG. 8, the broker would ensure that User A actually had the security he wishes to sell in his account. In addition, other oversight procedures normally performed by a broker can be performed at this time.

After the broker has approved User A's order, this order is then sent to other users connected to the individual securities trading network (815). This order can also be communicated to other users and entities outside the individual securities trading network. For users attached to the individual securities trading network, User A's order will appear in sell window 432 of trading screen 400. Once an order is transmitted to all of the other users on the individual securities trading network, it is placed alongside other orders for the same security in sell window 432. Orders are displayed according to the order's price, quantity of shares to be bought or sold, and other factors.

At some point, another user connected to the individual securities trading network, or a user or other entity external to the individual securities trading network can decide to accept User A's offer to sell a security. In the example depicted in FIG. 8, User B decides to accept User A's offer to sell a given security. To accept this offer, User B enters a market order to buy the specified security (820). Once User B enters a market order to buy a security, this order is then sent to the server (825). At the server, a broker has a chance to either approve or disapprove User B's order to buy the security (830). This approval process is very similar to the one conducted in step (810). In this instance, since User B is going to buy a security, the broker will ensure that User B has enough money in his account to cover his purchase of the security.

Assuming that User B's market buy order is approved by the broker, User B then selects User A's limit sell order from sell window 432 (835). The process by which User B can select an order is found in the discussion of trading screen 400. Once User B selects User A's order, this information is sent back to the server (840). Once User B's selection arrives at the server, the server can then note that a transaction has occurred, and can send confirmation of this transaction to both User A, User B, and other users attached to the individual securities trading network. The server will then transfer money from User B's account to User A's account, as well as performing other common "housekeeping" functions related to the completion of this transaction.

Figure 9:
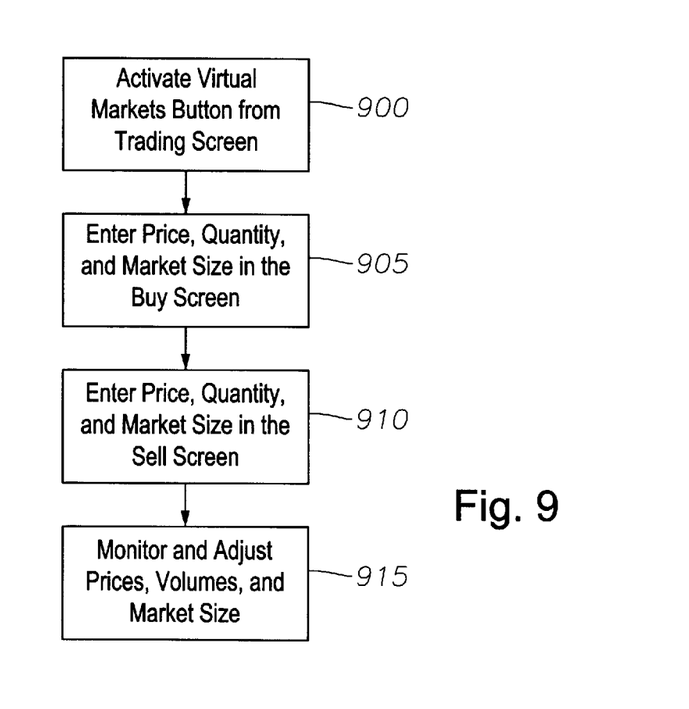
FIG. 9 depicts the process by which a user can create a market in a given security.
Figure 10:
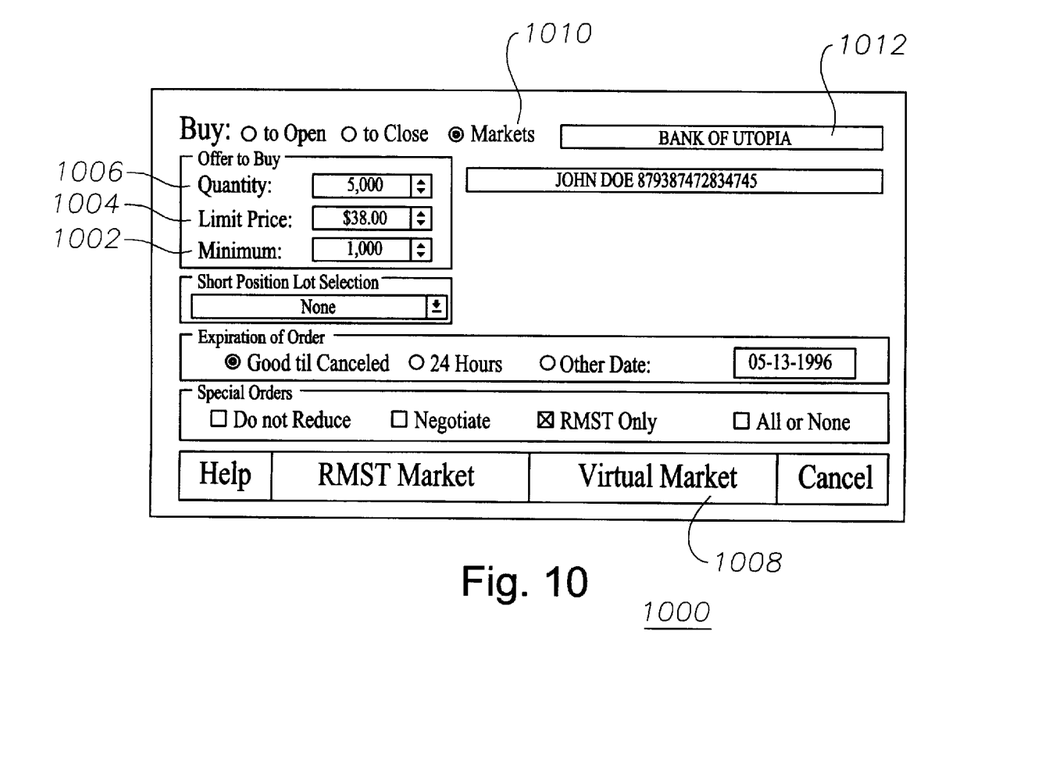
FIG. 10 illustrates the buy screen which is displayed when the user is creating a market in a particular security.

FIG. 9 depicts the process by which a user can create a market in a given security. A user can create a market in a security by selling a security, buying a security, or by simultaneously buying and selling a security. Initially, from trading screen 400, the user activates virtual market button 426. Upon the activation of this button, buy screen 1000, illustrated in FIG. 10, is displayed (900). Buy screen 1000 allows the user to enter their maximum long position in the security in which they are making a market, the maximum amount of the security that can be purchased in a single transaction, and the initial price they wish to begin purchasing the security (905). After these values are entered, the user activates button 1008 to display sell screen 1100.

Figure 11:
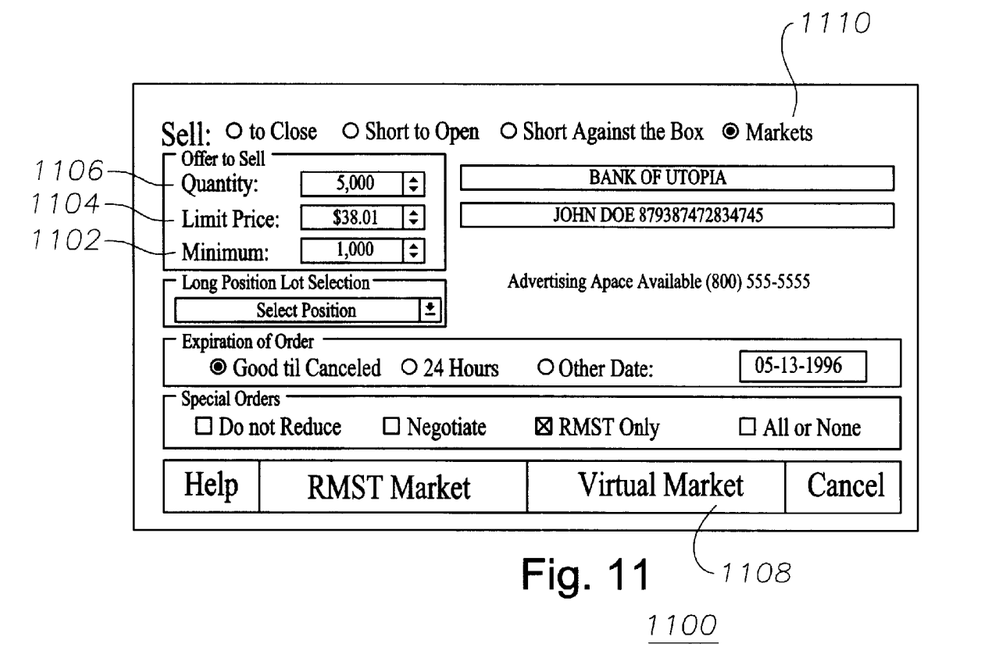
FIG. 11 depicts the sell screen which is displayed when the user is creating a market in a particular security.

Sell screen 1100, shown in FIG. 11, allows a user to enter the initial values at which the security in which the user is making a market will be sold. The maximum short position in the security in which a market is being made can be specified, along with the maximum amount of the security which can be sold at one time and the initial price at which the security will be sold (910). After this information is entered, the user activates button 1108 to return to the trading screen.

Figure 12:
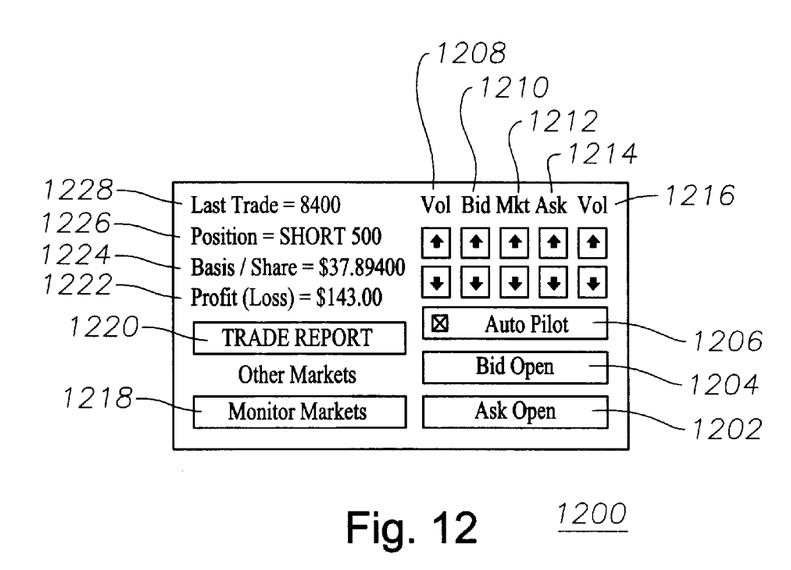
FIG. 12 illustrates a portion of the trading screen displayed when a user is making a market in a particular security.

When the trading screen is displayed it will resemble trading screen 400, with one exception. In place of sales graph window 434, market control window 1200, shown in FIG. 12, is displayed. Market control window 1200 allows the user to control the prices, volumes, and market size of the market they have created in a particular security (915).

FIG. 10 illustrates the buy screen which is displayed when the user is creating a market in a particular security. In buy screen 1000, the value within quantity field 1006 represents the maximum number of shares of a security that can be held at one time. The value within quantity field 1006 is also known as the maximum long position. The value within limit price field 1004 indicates the limit price which shares of the security will be initially sold. The value within market size field 1002 indicates the maximum size of the increments in which shares of the particular security will be bought. In the example shown in FIG. 10, shares of a particular security will be bought for $38.00/share, in quantities of up to 1000, until a maximum of 5,000 share are bought.

Markets indicator 1010 communicates to a user that the data they are entering in to buy screen 1000 will be used to create a market in a particular security. Security field 1012 displays the particular security in which a user is making a market. After the user has finished entering data into buy screen 1000, the user then activates virtual market button 1008 to proceed to sell screen 1100.

FIG. 11 depicts the sell screen which is displayed when the user is creating a market in a particular security. Whereas buy screen 1000 allowed a user to specify information relating to the buying of a particular security, sell screen 700 allows a user to specify information relating to the selling of a particular security. The value displayed in quantity field 1106 indicates a user's maximum short position. The value within limit price field 1104 indicates the price at which the particular security will initially be sold. Market size field 1102 indicates the maximum increment in which shares of the particular security will be sold. Fields 1102–1106 correspond closely with fields 1002—1002, shown in FIG. 10.

Also shown in sell screen 1100, markets indicator 1110 indicates that the information a user is entering will be used to make a market in the particular security previously chosen. When a user is finished entering information into sell screen 1100, they activate virtual market button 1108 to proceed back to trading screen 400.

FIG. 12 illustrates a portion of the trading screen displayed when a user is making a market in a particular security. After the user has entered information into buy screen 1000 and sell screen 1100, trading screen 400 is displayed as shown in FIG. 4, with one exception. In place of sales graph window 434, market control window 1200, shown in FIG. 12, is displayed in its place. Market control window 1200 allows a user to control the market he has created in a particular security. Control buttons 1208–1216 provide real-time control of the prices of the user's offers to sell and offers to buy.

Specifically, volume button 1208 raises or lowers the volume of the user's offer to buy. Bid control button 1210 raises or lowers the limit price of the user's offer to buy. Market control button 1212 raises or lowers both the user's ask and bid prices at the same time. Ask control button 1214 raises or lowers user's limit price of the offer to sell. Finally, volume control button 1216 raises or lowers the volume of the user's offer to sell.

Activation of auto-pilot button 1206 instructs the trading program to disregard the values entered in the quantity fields of buy screen 1000 and sell screen 1100. Instead, the security in which the user has created the market will be bought and sold in quantities as specified by the market size fields shown in buy screen 1000 and sell screen 1100. The particular security will be sold in these increments until the market is closed by the user.

Bid open/close button 1204 allows the user to temporarily close their limit order to buy securities. This allows a user to temporarily stop buying the security, and then begin buying the security when they reactivate bid open/close button 1204. In a similar manner, ask open/close button 1202 allows the user to temporarily stop selling the chosen security. Reactivation of ask open/close 1202 button will reinstate the user's limit offer to sell the chosen security.

Last trade field 1228 displays how many shares were bought or sold in the last trade executed. Position field 1226 displays the number of shares by which a user is short or long in the security they are making a market. Basis per share field 1224 displays the average price of the user's long or short position on a per share basis. Profit or loss field 1222 displays the user's net profit or loss in the market they have created. Activation of trade report button 1220 will display a summary of the execution activity in the market created by the user. Finally, monitor markets button 1218 allows a user to monitor other markets they have created.

It is important to note that while the present invention has been described in the context of a fully functional set of data processing systems, those skilled in the art will appreciate that the mechanisms of the present invention are capable of being distributed in the form of a computer readable medium of instructions in a variety of forms, and that the present invention applies equally regardless of the particular type of signal bearing media used to actually carry out the distribution. Examples of computer readable media include: recordable type media such as floppy disks and CD-ROMs and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for trading securities between individuals, comprising:

entering an offer of a first individual to trade a security on a first data processing system;

transmitting the offer to additional data processing systems, including a second data processing system, over a public communication network;

entering a reply of a second individual on the second data processing system, wherein the reply is in response to the offer;

executing a trade of the security based on information contained in the offer for consideration specified in the reply to the offer, whereby the security is traded efficiently between the first individual and the second individual;

transmitting to the second data processing system additional offers to trade in the security formed by additional individuals;

ranking the offer formed by the first individual and the additional offers formed by the additional individuals according first to a price value, then secondly, according to a quantity value; and displaying the offer formed by the first individual and the additional offers by the additional individuals according to the ranking step on a graphical user interface on the second data processing system.

2. The method as described in claim 1, wherein the step of entering a reply of a second individual on the second data processing system, wherein the reply is in response to the offer, includes:

using a pointing device to select the offer formed by the first individual from among the additional offers formed by the additional individuals from the graphical user interface on the second data processing system.

3. A network for trading securities between individuals, comprising:

entering means for entering an offer of a first individual to trade a security on a first data processing system;

transmitting means for transmitting the offer to additional data processing systems, including a second data processing system, over a public communication network;

entering means for entering a reply of a second individual on the second data processing system, wherein the reply is in response to the offer;

executing means for executing a trade of the security based on information contained in the offer for consideration specified in the reply to the offer, whereby the security is traded efficiently between the first individual and the second individual;

transmitting means for transmitting the offer to a server after the first individual forms the offer;

obtaining means for obtaining approval of the offer by a broker before the offer is transferred to the second individual;

transmitting means for transmitting to the second data processing system additional offers to trade in the security formed by additional individuals;

ranking means for ranking the offer formed by the first individual and the additional offers formed by the additional individuals according first to a price value, then secondly, according to a quantity value; and displaying means for displaying the offer formed by the first individual and the additional offers by the additional individuals according to the ranking step on a graphical user interface on the second data processing system.

4. The network as described in claim 3, wherein the entering means for entering a reply of a second individual on the second data processing system, wherein the reply is in response to the offer, includes:

a pointing device to select the offer formed by the first individual from among the additional offers formed by the additional individuals from the graphical user interface on the second data processing system.

\* \* \* \* \*

UNITED STATES PATENT AND TRADEMARK OFFICE
CERTIFICATE OF CORRECTION

PATENT NO. : 6,014,643
DATED : January 11, 2000
INVENTOR(S) : Vernon F. Minton

It is certified that error appears in the above-identified patent and that said Letters Patent is hereby corrected as shown below:

On the title page, item [75] Inventor's address should be:

Canterbury Circle
        Fort Worth, Texas 76112

Signed and Sealed this

Twenty-fourth Day of October, 2000

Attest:

Q. TODD DICKINSON

*Attesting Officer*     *Director of Patents and Trademarks*